Jan. 3, 1967     JAMES. E. WEBB     3,295,684
ADMINISTRATOR OF THE NATIONAL AERONAUTICS
AND SPACE ADMINISTRATION
HIGH PRESSURE FILTER
Filed Feb. 28, 1963
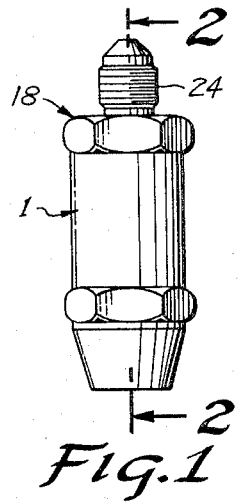
FIG. 1
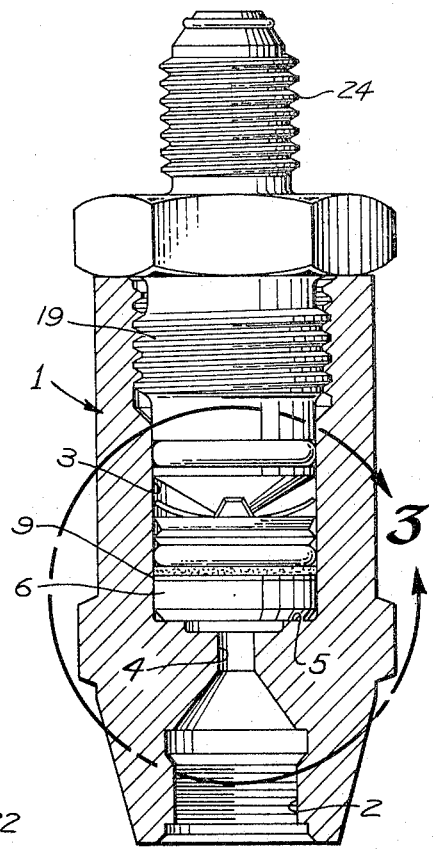
FIG. 2
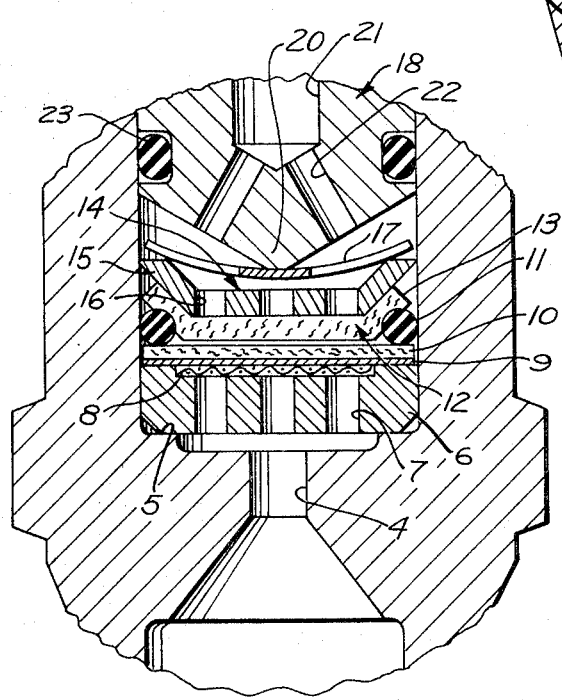
FIG. 3
FIG. 4
INVENTOR.
WILLIAM F. MACGLASHAN, JR.
BY
*[signatures]*
ATTORNEYS

United States Patent Office 3,295,684
Patented Jan. 3, 1967

3,295,684
HIGH PRESSURE FILTER
James E. Webb, Administrator of the National Aeronautics and Space Administration, with respect to an invention of William F. MacGlashan, Jr.
Filed Feb. 28, 1963, Ser. No. 261,918
2 Claims. (Cl. 210—314)

The invention described herein was made in the performance of work under a NASA contract and is subject to the provisions of Section 305 of the National Aeronautics and Space Act of 1958, Public Law 85-568 (72 Stat. 435; 42 USC 2457).

This invention relates to high pressure filters, more particularly to filters adapted to be placed in high pressure fuel lines, such as those intended to handle rocket fuel at pressures in the range of 12,000 pounds per square inch.

Included in the objects of this invention are:

First, to provide a compact, high pressure filter which incorporates a filter assembly that may be readily installed, removed, and replaced.

Second, to provide a high pressure filter wherein an initial and a final filter disk are both peripherally sealed with respect to the surrounding walls of the filter housing by an O-ring, which subtracts a minimum area from the total area of the filter disks so that the disks may be fitted in a bore of minimum diameter to reduce the stresses in the filter housing.

With the above and other objects in view, as may appear hereinafter, reference is directed to the accompanying drawings in which:

FIGURE 1 is an elevation view of the high pressure filter;

FIGURE 2 is an enlarged, longitudinal, sectional view thereof taken through 2—2 of FIGURE 1 with portions shown in elevation;

FIGURE 3 is a further enlarged, sectional view thereof taken within circle 3 of FIGURE 2;

FIGURE 4 is a top view of the filter assembly with portions broken away to show the underlying structure.

The high pressure filter includes a housing 1 having an internally screw-threaded outlet end 2, which is provided with a filter-receiving assembly bore 3 extending therein from its inlet end and connected to the outlet end 2 through a constriction 4 which forms a supporting shoulder 5.

Resting on the supporting shoulder 5 is a load-supporting disk 6 having a plurality of axially extending perforations 7. The upper side of the load-supporting disk 6 is provided with a shallow recess which receives a screen 8.

Supported on the screen 8 and the peripheral margin of the disk 6 is a perforated plate 9, having perforations of smaller dimension than the axially extending perforations 7. A final filter disk 10 overlies the perforated plate 9.

Resting on the peripheral portion of the final filter disk 10 is an O-ring seal 11. The O-ring seal supports an initial filter disk 12, the central portion of which is flat and the peripheral portion of which is conical, as indicated by 13, and slopes upwardly.

The initial filter disk 12 in turn receives a retainer disk 14 having a flat central portion and a conical periphery designated 15. The central portion of the retainer disk 14 is provided with a plurality of perforations 16. Resting on the retainer disk 14 is a leaf spring 17 of cross-shaped configuration, the arms of which rest on the conical periphery 15 of the retainer disk 14.

The upper end of the filter assembly receiving bore 3 is internally screw-threaded to receive an inlet fitting 18 having a screw-threaded stem 19 terminating in a conical end 20, the central portion of which is adapted to bear against the center of the leaf spring 17.

The inlet fitting 18 is provided with a bore 21 which terminates short of the conical lower end of the inlet fitting and is intersected by downwardly diverging ports 22. The inlet fitting is equipped with an O-ring seal 23, and its outer or inlet end is externally screw-threaded as indicated by 24.

The final filter disk 10 is preferably a thin sheet of cellulose with fine pores, and having a thickness between .002" and .010" so that, necessarily, in the drawing the thickness is exaggerated. The initial filter disk 12 is also formed of cellulose, which, however, is softer than the filter disk 10, and is capable of being compressed. The thickness of the initial or preliminary filter disk 12 is in the range between .040" and .075".

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A high pressure filter, comprising:
   (a) a housing including a central bore having a constricted outlet port forming a supporting shoulder;
   (b) an axially perforated support member on said shoulder;
   (c) a filter cartridge fitted in said bore and retained by said support member, said filter cartridge including a flat final filter disk, a preliminary filter disk superposed over said final filter disk and having an upturned frusto-conical rim, a seal ring interposed between said rim and the periphery of said final filter disk, and a perforated retainer superposed upon said preliminary filter disk and having an upturned frusto-conical rim conforming to said preliminary filter disk;
   (d) an inlet fitting closing said bore and including downwardly diverging inlet ports directed toward said rim;
   (e) and yieldable biasing means interposed between the inlet fitting and said filter cartridge.

2. A high pressure filter, comprising:
   (a) a housing including a central bore having a constricted outlet port forming a supporting shoulder;
   (b) an inlet fitting screw-threaded in said bore and having a conical tip and downwardly diverging inlet ports surrounding said tip;
   (c) an axially perforated support member bearing against said shoulder;
   (d) a load-distributing screen overlying said perforations;
   (e) a perforated plate overlying said screen;
   (f) a perforated plate overlying said screen;
   (g) a preliminary filter element overlying said final filter sheet;
   (h) a seal ring interposed between said filter sheet and filter element and sealingly engaging the walls of said bore;
   (i) a retainer disk having an upwardly diverging unperforated marginal rim, disposed in the path of discharge from said diverging ports, and a central perforated portion overlying said preliminary filter element;

(j) and a cross-shaped spring having radial arms bearing against the rim of said retainer and a central portion engaged by the conical end of said inlet fitting.

References Cited by the Examiner

UNITED STATES PATENTS

| | | | |
|---|---|---|---|
| 593,573 | 11/1897 | Franke et al. | 210—449 X |
| 639,471 | 12/1899 | Van Alstine | 210—339 |
| 2,381,627 | 8/1945 | Thompson | 210—335 X |
| 2,793,016 | 5/1957 | Aghnides | 210—449 X |
| 2,798,718 | 7/1957 | Gross | 55—488 X |
| 3,206,216 | 9/1965 | Crook | 210—450 X |

FOREIGN PATENTS 883,301   3/1943   France.

REUBEN FRIEDMAN, *Primary Examiner.*

F. W. MEDLEY, *Assistant Examiner.*